United States Patent [19]

Ruiz

[11] Patent Number: 4,529,093
[45] Date of Patent: Jul. 16, 1985

[54] SELF-LEVELING PLATE DISPENSER

[75] Inventor: Guillermo A. Ruiz, Miami, Fla.

[73] Assignee: Shelley Manufacturing Division of Alco Food Service Equipment Company, Miami, Fla.

[21] Appl. No.: 506,528

[22] Filed: Jun. 22, 1983

[51] Int. Cl.³ .............................................. A47F 7/00
[52] U.S. Cl. .................................. 211/59.2; 211/59.3
[58] Field of Search ............... 211/490; 221/242, 282; 312/71, 42; 248/172

[56] References Cited

U.S. PATENT DOCUMENTS

| | | | |
|---|---|---|---|
| 1,548,410 | 8/1925 | Derbyshire | 248/172 |
| 3,190,453 | 6/1965 | Shelley | 211/59.3 |
| 3,276,830 | 10/1966 | Vordran | 211/59.3 X |
| 3,937,361 | 2/1976 | House | 221/242 |
| 4,206,954 | 6/1980 | Kooiman | 312/71 |
| 4,354,605 | 10/1982 | Brutsman | 211/59.3 |
| 4,449,760 | 5/1984 | House | 312/71 X |

Primary Examiner—Ramon S. Britts
Assistant Examiner—Sarah A. Lechok

[57] ABSTRACT

An adjustable, self-leveling dispenser for stacked plates has a load carrier within a plate well or tank and a plurality of tension springs peripherally arranged about the outer periphery of the tank and connected between a lower spring carrier ring moveable along the outside of the tank and an upper spring carrier ring fixed with respect to the tank, the lower spring carrier member being secured to radially-extending support members projecting through longitudinally-extending slots in the tank for yielding and supporting the load carrier from underneath. A plurality of guide rod members vertically disposed in spaced relation within the tank and stepwisely adjustable along a range of distances outwardly of the center of the pressure head serve as abutment slide means for guiding peripheral edge portions of any selected size of a wide range of sizes of stacked plates to be dispensed.

5 Claims, 8 Drawing Figures

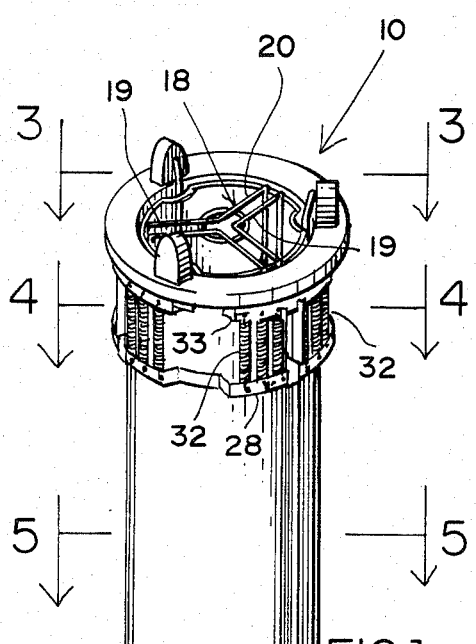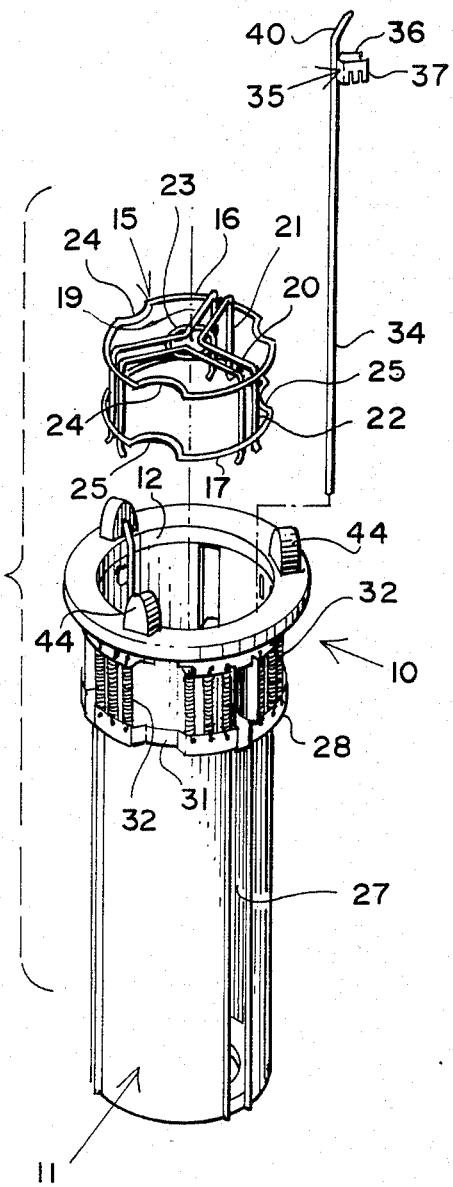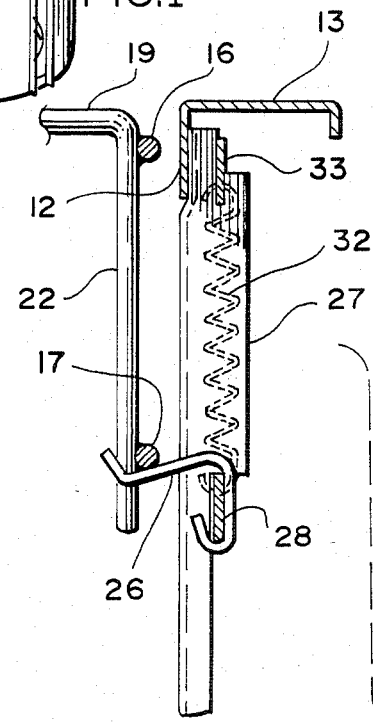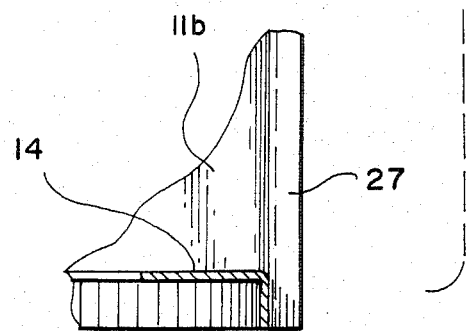

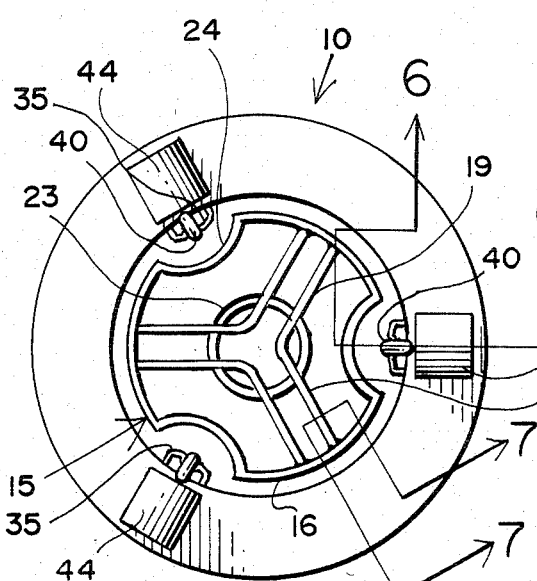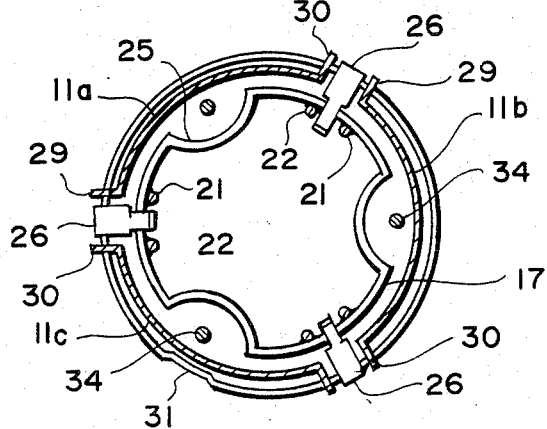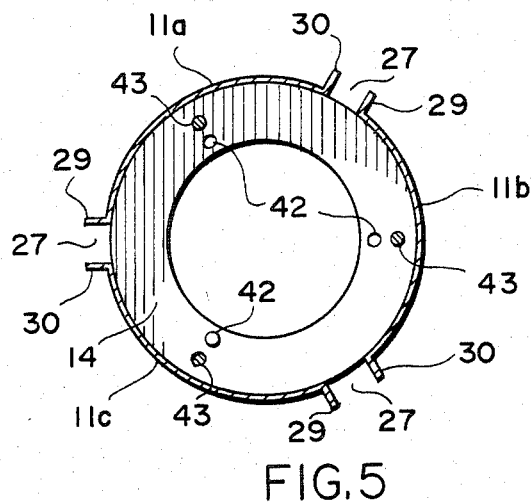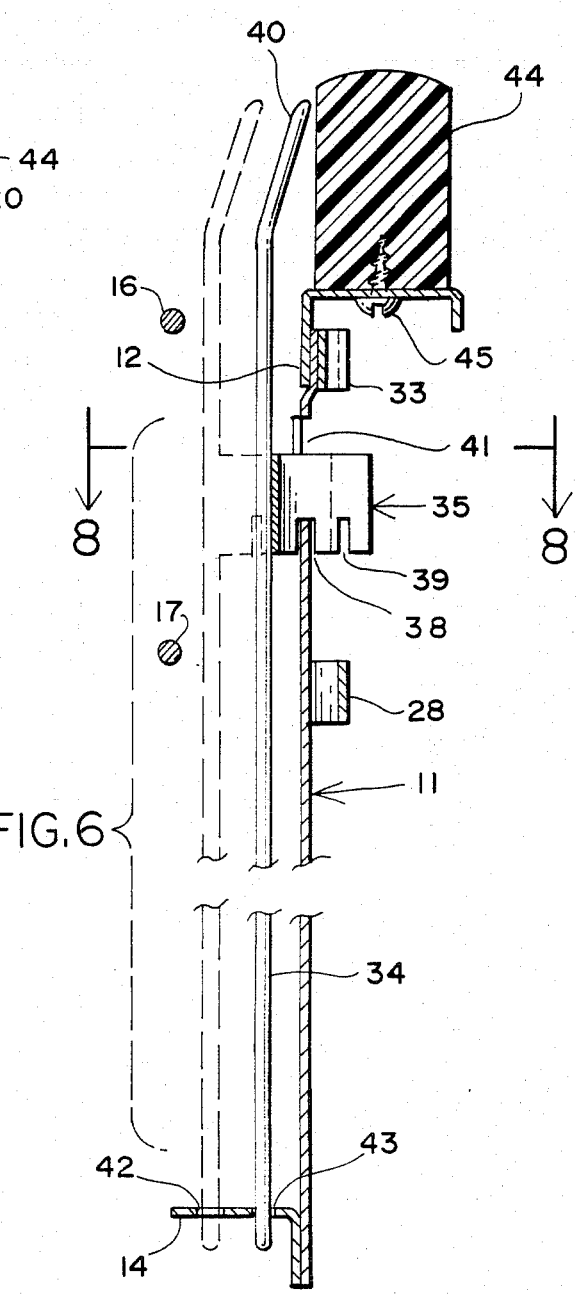

SELF-LEVELING PLATE DISPENSER

BACKGROUND OF THE INVENTION

This invention relates to self-leveling plate or dish dispensers of the type used in cafeterias or restaurants, for example, and is directed particularly to improvements therein, particularly with respect to the guide mechanism for accommodating a range of sizes, selectively, of the dishes to be dispensed.

In U.S. Pat. No. 3,937,361, issued Feb. 10, 1976, there is illustrated and described an adjustable self-leveling plate dispenser having an internal compression spring constrained between a pressure head upon which the stacked dishes are supported and the bottom of the dispensing tank, and further including a plurality of vertically-extending guide rods adjustable radially of the vertical axis of the dispensing tank to accommodate various sizes of dishes to be dispensed. Because food particles and other foreign matter falls through the upper end of the tank to accumulate at the inside, it is often necessary, for sanitation purposes, to remove the pressure head to clean the tank and the plate guide mechanism.

SUMMARY OF THE INVENTION

It is the principal object of the present invention to replace such an internal plate guide mechanism with guide rods the radial adjustment of which is controlled by flat hook members attached in spaced relation therealong and extending outwardly through slots in the side of the tank, thereby minimizing that portion of the plate guide mechanism within the tank and obviating contamination by food particles, dust and the like falling through the top of the tank. The cleaning of the interior of the tank, whenever necessary, is thus facilitated.

Another object of the invention is to simplify the adjustable plate guide mechanism to provide for its easy removal, thereby further simplifying cleaning and sanitizing of the tank.

Other objects, features and advantages of the invention will be apparent from the following description when read with reference to the accompanying drawings.

BRIEF DESCRIPTION OF THE DRAWINGS

In the drawings, wherein like reference numerals denote corresponding parts throughout the several views:

FIG. 1 is an oblique view, as viewed from above, of an adjustable plate dispenser embodying the invention;

FIG. 2 is an "exploded" view of the plate dispenser illustrated in FIG. 1, separately illustrating the plate support member or load carrier and one of the plate diameter adjustment rods;

FIG. 3 is a top plan view of the plate dispenser, taken along the plane indicated at 3—3 of FIG. 1 in the direction of the arrows;

FIG. 4 is a horizontal cross-sectional view, taken along the line 4—4 of FIG. 1 in the direction of the arrows;

FIG. 5 is a horizontal cross-sectional view, taken along the line 5—5 of FIG. 1 in the direction of the arrows;

FIG. 6 is a partial vertical cross-sectional view, taken along the line 6—6 of FIG. 3 in the direction of the arrows;

FIG. 7 is a partial vertical cross-sectional view, taken along the line 7—7 of FIG. 3 in the direction of the arrows; and FIG. 8 is a partial horizontal cross-sectional view, taken along the line 8—8 of FIG. 6 in the direction of the arrows.

Referring now in detail to the drawings, reference numeral 10 in FIGS. 1, 2 and 3 designates, generally, an adjustable, self-leveling plate dispenser embodying the invention. The self-leveling plate dispenser comprises a cylindrical tank 11 the upper end of which has spot-welded or otherwise secured against the outside thereof a short, downwardly-extending skirt portion 12 having an annular upper end flange 13 which serves to support the assemblage within a circular opening provided in a serving table or counter top, for example. The cylindrical tank 11 is fabricated of sheet metal, preferably stainless steel, and is enclosed at the lower end with a circular, peripherally-flanged annular bottom plate 14, spot-welded in place.

Vertically slidable within the cylindrical tank 11 is a load carrier 15. The load carrier 15 is fabricated of stainless steel rod, and comprises upper and lower rings 16 and 17, respectively, secured in spaced, parallel relation by three symmetrically arranged angular members 18. Each angular member 18 comprises horizontal arm portions 19, 20 defining an angle of approximately 120 circular degrees, the ends of which extend vertically downwardly to define leg portions 21, 22. The upper ring 16 is welded to outer end portions of the angular members 18, whereas the lower ring member 17 is welded against outer portions, near the lower ends, of the leg portions 21, 22. A comparatively small diameter bracing ring 23 is welded against the undersides of the horizontal arm portions 19, 20 of the angular members 18, at a central position.

The upper and lower load carrier rings 16, 17 are formed with three sets of vertically spaced, arcuate, inwardly-directed bends 24, 25 for the purpose hereinafter appearing.

As best illustrated in FIGS. 4 and 7, upon assembly or placement of the load carrier 15 within the cylindrical tank 11, those portions of the lower load carrier ring 17 between adjacent angular members 18 rest upon respective bent sheet metal support members 26, each of which extends through a slot 27 in the cylindrical tank 11 and is attached in place by bending over and around the lower ends of a spring carrier ring 28 circumjacent said tank. As illustrated in FIGS. 4 and 5, the three equidistantly-circularly-spaced slots 27 are defined by three equal arcuate tank sections 11(a), 11(b) and 11(c), the outer longitudinal edges of which are formed with short, substantially radially-outwardly extending flange portions 29, 30. As illustrated in FIG. 2, the spring carrier ring 28 is formed with three circularly-spaced, inwardly-offset portions 31 that slide against outer surface portions of respective tank sidewall portions 11(a), 11(b) and 11(c). The outer arcuate portions of the spring carrier ring 28 are each provided with three sets of equidistantly-spaced openings along their lengths for the removable interconnection of lower end hook portions of tension springs 32. The upper ends of the tension springs are removably hooked in vertically-aligned openings of an upper spring carrier ring 33 secured at inwardly-offset portions to the upper end, at the outside, of the cylindrical tank 11. It will be understood that the tension springs 32, being fixed at their upper ends with respect to the tank 11, supply upwardly-directed resiliant tension to the load carrier 15 through support members 26. It is also to be understood that the spring rate of the tension springs 32, which is governed by the characteristics of a spring wire, the number of coils per unit length and the diameter of the coils, will be such as supplies a substantially constant force against the underside of the load carrier 15. A sufficient number and size of tension springs 32 will be interhookingly engaged between upper spring carrier ring 33 and lower spring carrier ring 28 to support any given weight of stacked plates so that the upper-most one will be in proper position for ready withdrawal.

An important feature of this invention resides in the mechanism the means by which adjustments can be made for accommodating the plate dispenser to use for dispensing various diameters or sizes of plates. To this end, as illustrated in FIGS. 1, 2, 3 and 6, there is provided, within the cylindrical tank 11, a plurality, three in the embodiment illustrated, of vertically-extending, circularly-spaced guide rods 34. As best illustrated in FIGS. 3, 6 and 8, each guide rod 34 has secured thereto, as by welding, a radially-outwardly-extending hook member 35, which may, for example, be of sheet stainless steel, bent into U-shaped configuration. The spaced, parallel sides 36, 37 of the hook member 35 extend vertically in spaced, parallel relation to their respective guide rods, with the inter-connecting web portions thereof being centrally welded along their lengths to their associated guide rods at a position near the upper ends thereof. The sides 36, 37 of each hook member are provided with a pair of radially-outwardly-spaced slots, 38, 39, extending upwardly from their lower edges for adjustment purposes, as is hereinafter described. The upper end of each guide rod 34 is bent radially outwardly, as indicated at 40 in FIGS. 2, 3 and 6, for example. The hook members 35 of the guide rods 34 can be placed to extend through respective rectangular openings 41 provided in each of the arcuate tank portions 11(a), 11(b) and 11(c) for selective hooking interengagement of the slots 38 or 39 with upper marginal edge portions of their openings. Thus, as illustrated by the full-line representation thereof in FIG. 6, the hook member 35 is illustrated with its slots 38 in interengagement with the lower marginal edge of its associated rectangular opening 41 so that the guide rod is located in relatively close position with respect to the interior wall of the cylindrical tank 11. The broken-line position of the guide rods 34 is assumed when the hook member slots 39 are brought into hooking interengagement with upper edge portions of the associated lower marginal edge of the rectangular opening 41, (see FIGS. 6 and 8) to locate the guide rods at relatively inwardly-spaced positions within the cylindrical tank 11, thereby to accommodate for dispensing plates of relatively small diameter, as is hereinafter more fully described.

As illustrated in FIGS. 5 and 6, the annular bottom plate 14 of the cylindrical tank 11 is provided with pairs of radially-spaced openings 42, 43, for locating the lower ends of respective guide rods 34 when in each of their two selective positions as described above. It will be understood that the opening pairs 42, 43 are so located and spaced as to retain the guide rods in substantially vertical position within the cylindrical tank 11 in each selective position.

As illustrated in FIGS. 2, 3 and 6, rounded, generally triangular, bumper guide members 44, one for each of the three guide rods 34, are fixed against the tank upper end flange 13, as by screws 45 (see FIG. 6). The bumper guide members are preferably fabricated by molding of a slightly resilient plastic material, and, as illustrated in FIG. 1 for example, are located directly behind one each of the guide rods 34, at the upwardly-projecting, bent upper end 40 thereof.

In use, the self-leveling plate dispenser 10 accommodates, selectively, three different sizes or diameters of plates, the largest diameter being accommodated when the three guide rods 34 are completely withdrawn. Under that condition, plates of slightly lesser diameter than the interior diameter of the cylindrical tank can be placed in stacks upon the load carrier 15 for dispensing from the top, one at a time. The uppermost plates of a stack, which will automatically project a short distance above the tank upper end flange 13, will be constrained against sideward sliding by the upwardly-extending bumper guide members 44.

If an intermediate diameter size of plate is to be dispensed, the guide rods 34 will be assembled to the tank 11 with use of the slot sets 38 of their respective hook members 35, as illustrated by the full-line representation thereof in FIG. 6 and as described above. The smallest size of plate diameter is accommodated for by moving the guide rods 34 inwardly to the position represented by the broken-line illustration hereof in FIG. 6, as described above. With use of the guide rods 34 for dispensing smaller diameter plates, it will be understood that the radially-outwardly-bent upper end portions 40 of the guide rods 34 serve to prevent any substantial sideward sliding of plates at the upper end of a stack to be dispensed, while at the same time providing guidance for loading the plate dispenser with more stacks of plates to be dispensed.

While I have illustrated and described herein only one form in which my invention can conveniently be embodied in practice, it is to be understood that this form is presented by way of example only, and not in a limiting sense. The invention, in brief, comprises all the embodiment and modifications coming within the scope and spirit of the following claims.

What I claim as new and desire to secure by Letters Patent is:

1. In a self-leveling plate dispenser of the type having a vertically-extending, open-top tank for receiving stacked plates, dishes or platters to be dispensed and including mechanism resiliently constraining the stacked plates, dishes or platters therein in the upward direction from underneath for dispensing from the top of the tank, the improvement comprising, mechanism for vertically guiding within the tank any one, selectively, of an incremently increasing range of peripheral sizes of such stacked plates, dishes or platters, said vertically guiding mechanism comprising a plurality of vertically-disposed guide rods circularly spaced within the tank, means for independently stepwisely adjusting each of said guide rods along a range of distances extending radially outwardly of the central longitudinal axis of the tank, said guide rods serving as abutment slide means for guiding peripheral edge portions of any selected one of a range of incremently increasing sizes and peripheral shapes of stacked plates, dishes or platters placed in the tank for dispensing, said guide rod adjusting means for each of said stepwise adjusting means comprising hook means fixed to and extending radially outwardly of said guide rod and projecting through a rectangular opening in the tank, said hook means comprising a flat hook member having a plurality of mutually-spaced recesses of equal depth opening to the bottom edge thereof, said recesses being selectively placeable over the lower edge of said rectangular opening in said tank for adjustably positioning said guide rod in a predetermined radially-outward distance with respect to the central longitudinal axis of the tank, said tank having a bottom plate with radially-spaced openings for selectively receiving and locating the lower ends of respective ones of said guide rod for retaining them in spaced, parallel relation with respect to the central longitudinal axis of the tank, said hook means further comprising a sheet metal member bent into U-shaped configuration to define a pair of spaced, parallel flat hook members, each having an identical plurality of said mutually-spaced recesses of equal depth opening to the bottom edges thereof.

2. The invention as defined in claim 1, wherein upper end portions of each of said guide rods extend upwardly and outwardly of the upper end of the tank and is bent radially outwardly at an obtuse angle.

3. The invention as defined in claim 2, including a plurality, one for each of said guide rods, of relatively resilient bumper guide members fixed with respect to the upper end of the tank and projecting upwardly thereof in spaced relation behind each of said radially-outwardly-bent portions of said guide rods.

4. The invention as defined in claim 3, wherein said resiliantly constraining mechanism comprises a load carrier and a plurality of support members within the tank for removeably supporting said load carrier, said load carrier being fabricated of open-framework stainless steel rod to provide for the free passage of food particles and other debris through to the bottom of the tank.

5. The invention as defined in claim 4, wherein said bumper guide members are fabricated of a resilient synthetic plastic material.

* * * * *